United States Patent [19]
Kornfeld

[11] 3,858,031
[45] Dec. 31, 1974

[54] CREDIT CARD HAVING CLEAR MIDDLE LAYER ENCODED BY DISCRETE OPAQUE AREAS AND SYSTEM FOR DECODING SAME BY LASER BEAM

[75] Inventor: Jack P. Kornfeld, Glencoe, Ill.

[73] Assignee: Bliss & Laughlin Industries, Incorporated, Oak Brook, Ill.

[22] Filed: Feb. 16, 1973

[21] Appl. No.: 333,204

[52] U.S. Cl. ............. 235/61.11 E, 235/61.7 B, 235/61.12 N, 250/566, 340/173 LT
[51] Int. Cl. ...... G06k 7/10, G06k 19/06, G08c 9/06
[58] Field of Search . 235/61.11 E, 61.12 N, 61.7 B; 340/149 A, 173 LT, 173 MA; 250/219 R, 219 Q, 219 D

[56] References Cited
UNITED STATES PATENTS
3,728,521   4/1973   Borough et al. ............ 235/61.12 N

*Primary Examiner*—Daryl W. Cook
*Attorney, Agent, or Firm*—Davis, McCaleb & Lucas

[57] ABSTRACT

Laminated credit or other identification card having a center layer of clear, light-transmitting material between a pair of opaque cover sheets. The card is coded by providing discrete areas of opaque material in the center layer with windows between them defining parallel light-transmitting channels extending edgewise through the center layer and spaced apart irregularly along the card in accordance with a predetermined code. The card is decoded by directing one or more laser beams edgewise through the center layer toward one or more light sensors and moving the card to produce output signals corresponding to the number and spacing of the light-transmitting channels. In one embodiment, a main laser beam is directed edgewise through the card at a right angle to produce a main read-out signal and simultaneously an auxiliary or check laser beam is directed edgewise through the card at a different angle. Separate light sensors and read-out devices produce two separate identification numbers, code names, or other indicia.

8 Claims, 6 Drawing Figures

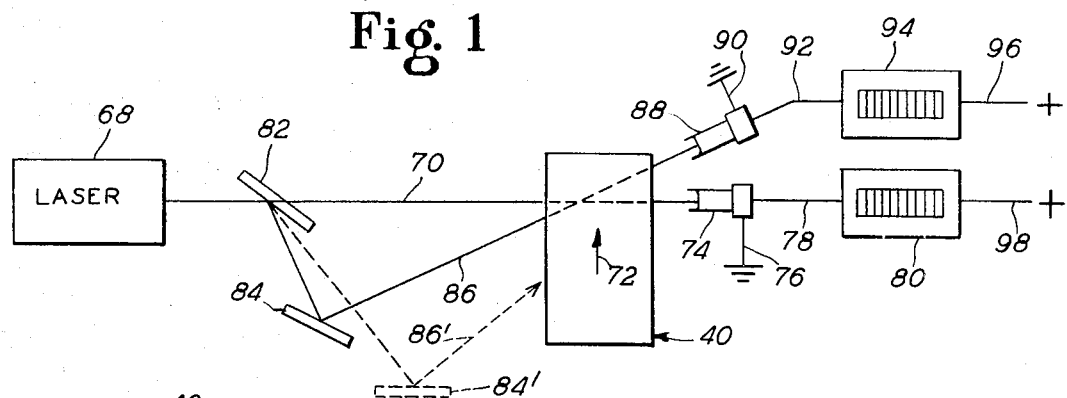
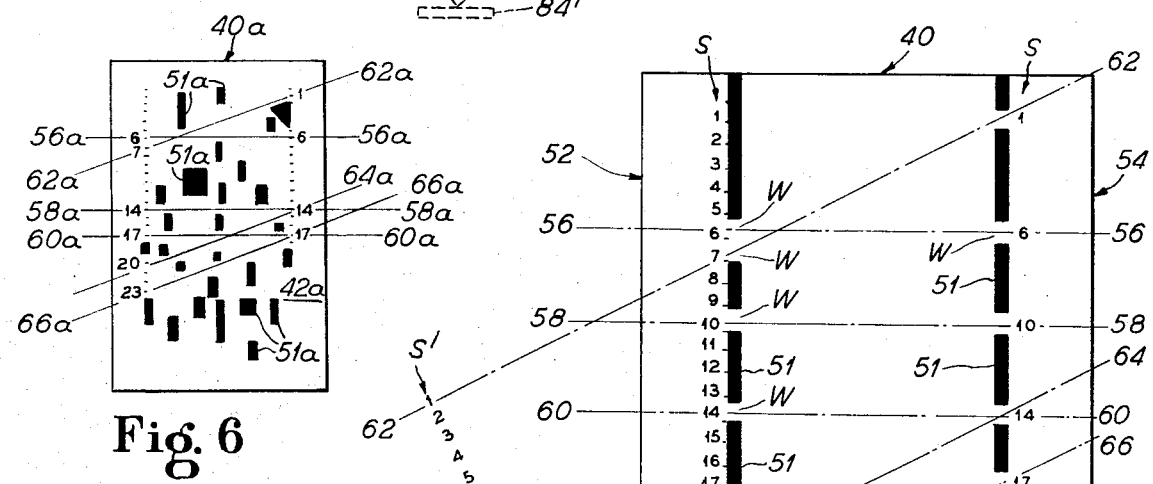
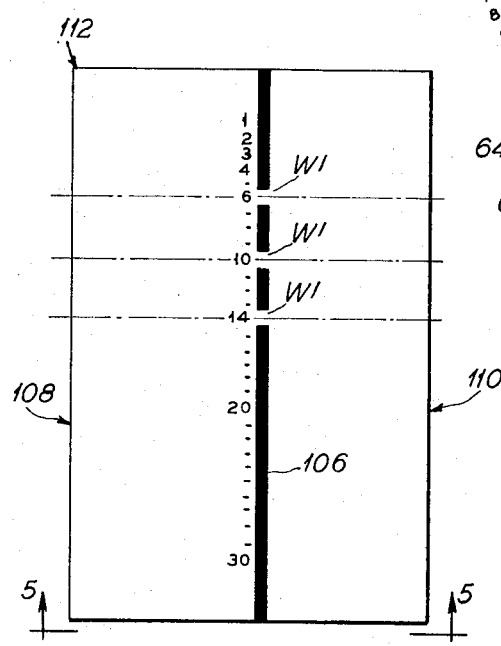
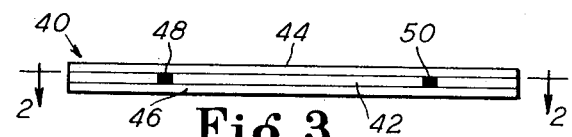

CREDIT CARD HAVING CLEAR MIDDLE LAYER ENCODED BY DISCRETE OPAQUE AREAS AND SYSTEM FOR DECODING SAME BY LASER BEAM

BACKGROUND OF THE INVENTION

The invention belongs to the field of credit or identification cards. These will be referred to generally herein as credit cards.

The rapid expansion of credit cards to purchase goods and services has created some serious problems, among which are the illegal or improper use of the cards by people seeking credit. "Illegal use" is the unauthorized use of a credit card by a person not named on it such as one who has acquired a lost or stolen card. "Improper use" is use by a person or persons named on the card but whose credit has been revoked or limited.

In conventional credit card systems, the bearer is identified by comparing his signature with one on the card. It is important that the organization extending credit by means of a credit card have a better way to identify the bearer of a card.

SUMMARY OF THE INVENTION

It is a general object of the present invention to provide a credit card and system for encoding and decoding same having improved confidential means to identify the user. In a specific application, the user would memorize one or more identification numbers, code names, or other indicia which are not apparent on the face of the card and when the card is decoded by a special laser beam reader to display those same identification numbers, etc., the user is verified as the proper holder.

An important feature of the invention is the provision of a laminated credit card having a transparent center layer encoded by a plurality of discrete opaque areas set back substantially inwardly from the edges and therefore not readily visible, such opaque areas defining windows or light-transmitting channels which are spaced apart irregularly along the length of the card in accordance with a predetermined code and are decodable in a reader capable of supporting the card and moving it edgewise between laser means and light sensor means to interrupt the laser beam in a unique, information-related pattern.

Another important feature of the invention is the provision of such a credit card in which the opaque areas in the center layer define two or more sets of parallel light-transmitting channels spaced apart irregularly along the length of the card in accordance with a predetermined code, the light-transmitting channels in each set extending edgewise through the transparent center layer at an angle different from those in any other set, enabling the different sets of channels to be decoded by separate laser beams focused through the card at different, predetermined angles, thereby rendering the card virtually counterfeit-proof by requiring simultaneous verification with a plurality of laser beams uniquely oriented at angles known only to the organization granting credit.

Other object and advantages will be apparent from the following description taken in connection with the accompanying drawings in which:

BRIEF DESCRIPTION OF THE DRAWINGS

FIG. 1 is a diagrammatic view of a multiple read-out credit card system employing the principles of the present invention;

FIG. 2 is an enlarged interior view of the credit card shown in FIG. 1, with one of the cover sheets removed, as seen along line 2—2 of FIG. 3 and showing the encoded transparent middle layer;

FIG. 3 is an end view of FIG. 2 as seen in the direction of arrows 3—3;

FIG. 4 is a view similar to FIG. 2 of a single readout credit card which may be used with the present invention, with one of the cover sheets removed, as seen along line 4—4 of FIG. 5;

FIG. 5 is an end view of FIG. 4 as seen in the direction of arrows 5—5; and

FIG. 6 is a view similar to FIG. 2, on a reduced scale, showing an alternate arrangement of opaque areas in the transparent center layer.

Like parts are referred to by like reference characters.

DESCRIPTION OF THE PREFERRED EMBODIMENT

Referring now to the specific embodiments of the invention in the drawings, the credit card shown in FIGS. 1, 2 and 3 is generally designated 40. It has a rectangular body of a size suitable for carrying in a purse or wallet, and comprises a clear light-transmitting center sheet or layer 42 between a pair of opaque cover sheets 44 and 46.

The card 40 is coded by a pair of spaced, parallel, linear barriers 48 and 50 comprising discrete opaque areas 51 extending along and substantially inwardly from the card long edges 52 and 54, respectively. These edges are open, preferably being ground and polished to facilitate the transmission of light into and out of the clear center sheet 42.

The card 40 is encoded by a unique arrangement of light-transmitting windows W between the opaque areas 51 in the barriers 48 and 50. The windows W are arranged in aligned pairs, each pair of windows constituting a light-transmitting channel. One window of each pair is in each barrier, and there are two sets of pairs of windows (and two corresponding sets of parallel light-transmitting channels) as will now be described.

Each barrier 48 and 50 has thirty numbered positions, as shown by the scales marked S. Reference to windows at these specific numbered positions will facilitate the following description.

The first set of pairs of windows are at positions 6/6, 10/10 and 14/14 in the respective barriers 48 and 50. A light beam at a right angle to the long axis of the card can be directed through this first set of pairs of windows, as indicated by main light-transmitting channels 56—56, 58—58 and 60—60.

The second set of pairs of windows are at positions 7/1, 20/14 and 23/17 in the respective barriers 48 and 50. A light beam at an acute angle to the long axis of the card can be directed through this second set of pairs of windows, as indicated by auxiliary light-transmitting channels 62—62, 64—64 and 66—66.

Referring now to FIG. 1, apparatus is shown for separately and simultaneously decoding and displaying the information coded into the main and auxiliary lighttransmitting channels described above. A laser 68 has a main beam 70 directed toward the card 40 at a right angle to the long axis of the card. The card is mounted (by means not shown) for longitudinal movement in the direction of the arrow 72. As the card so moves the main laser beam 70 will be directed edgewise through it, first through channel 56—56, then through channels 58—58 and 60—60 to a main light sensor 74 which is grounded at 76.

Each flash of light received by the sensor 74 produces an output signal in conductor 78 which advances a main counter 80 an amount on the binary scale depending on the bit position of the card at the time. This may be a standard binary counter forming no part of the present invention so need not be described in detail.

As stated, each barrier 48 and 50 is provided with thirty bit positions which are numbered from top to bottom in FIG. 3. Using thirty bit positions in the binary code system, each position would be assigned a value as shown in the following table:

| Bit Positions | Value | Bit Positions | Value |
| --- | --- | --- | --- |
| 1 | 1 | 16 | 32,768 |
| 2 | 2 | 17 | 65,536 |
| 3 | 4 | 18 | 131,072 |
| 4 | 8 | 19 | 262,144 |
| 5 | 16 | 20 | 524,288 |
| 6 | 32 | 21 | 1,048,576 |
| 7 | 64 | 22 | 2,097,152 |
| 8 | 128 | 23 | 4,194,304 |
| 9 | 256 | 24 | 8,388,608 |
| 10 | 512 | 25 | 16,777,216 |
| 11 | 1,024 | 26 | 33,554,432 |
| 12 | 2,048 | 27 | 67,108,864 |
| 13 | 4,096 | 28 | 134,217,728 |
| 14 | 8,192 | 29 | 268,435,456 |
| 15 | 16,384 | 30 | 536,870,912 |

Main laser beam 70 directed at right angles successively through the card at bit positions 6/6, 10/10 and 14/14 will produce a total of 8,736 on the main counter 80. This will be a confidential number known only to the organization granting credit and to the bearer and may be used to verify the bearer's identify at a point of purchase.

Referring again to FIG. 1, a beam splitter 82 diverts a portion of main beam 70 to a mirror 84 which directs an auxiliary or check beam 86 at an acute angle through the card 40 parallel to auxiliary light-transmitting channels 62—62, 64—64 and 66-66 (see FIG. 3) to an auxiliary or check light sensor 88 which is grounded at 90. As the card moves, flashes of light are directed to the auxiliary light sensor 88 along the three acute angle channels 62—62, 64—64 and 66—66. With each flash of light so sensed, the auxiliary light sensor produces an output signal in conductor 92 which advances an auxiliary counter 94 an amount on the binary scale depending on the bit position of the card at the time. As will be noted in FIG. 3, and because of the angle of the auxiliary beam 86, only twenty bit positions are provided on auxiliary scale S'. The auxiliary lighttransmitting channels 62—62, 64—64 and 66-66 coincide with bits 1, 13 and 16 on scale S'. These produce a total of 36,865 which is a second confidential number known only to the organization granting credit and to the bearer and may be used to further verify or double-check the bearer's identity. Counters 80 and 94 are connected to an electrical power source by conductors 96 and 98.

FIG. 6 shows a modified form of the credit card 40a shown in FIG. 2. The only difference is the arrangement of opaque areas. Note that the opaque areas 51a are randomly arranged in the transparent center layer 42a, but are spaced apart to provide main light-transmitting channels 56a—56a, 58a—58a, and 60a—60a and auxiliary light-transmitting channels 62a—62a, 64a—64a, and 66a—66a which correspond exactly with those shown in FIG. 2.

Among the variations of the present invention, only one of the counters 80 or 94 may be used, in which case the other would be deactivated or simply not employed. Further, while a single laser 68 is employed with a beam splitter, separate and individual lasers may be provided to generate the main and auxiliary beams 70 and 86. As a still further variation of the system shown in FIG. 1, the mirror 84 may be reoriented and moved to the broken line position designated 84', so a check beam 86' may be directed through the clear center layer 42 at a different acute angle.

A simplified form of credit card utilizing the principles of the present invention is shown in FIGS. 4 and 5. It is generally designated 112 and comprises a clear light-transmitting center sheet 100 between a pair of opaque cover sheets 102 and 104. The card is coded by a single linear barrier 106 extending the length of the card between open edges 108 and 110. Card 112 is encoded by means of windows W' at the 6, 10 and 14 bit positions. When used in the decoding apparatus of FIG. 1, it could produce a read-out total of 8,736 on either or both of the counters 80 and 94.

In both cards 40 and 112, their thicknesses have been exaggerated for the sake of illustrating the descriptions. It will be understood that they need be no more than 0.03 inch thick overall, and the clear center layer in each case may be about 0.01 inch thick. An important security feature is that the opaque barriers 48, 50 and 106, and opaque areas 51 and 51', are set back substantial distances from the edges of the cards and are visible only upon minute inspection with special magnifying equipment. Further, the angles of the main beam 70 and check beam 86 (or 86') which are used in decoding the card cannot possibly be known from any visual inspection of the card itself.

The cards 40, 40a and 112 may be manufactured by usual mass production plastics laminating methods. The clear center sheet in each case may be optical grade of polymerized methyl methacrylate ("LU-CITE") with the barriers 48, 50 and 106, and opaque areas 51', comprising opaque inserts in punched openings which are spaced apart to define the windows W and W'. Stacks or strips of these clear center sheets 42, 42' and 100 may be encoded at high speed by punching equipment (not shown) controlled by a single operator or automated control. The cards may then be laminated under heat and pressure and the long edges ground and polished.

The above described arrangements and methods are illustrative of a small number of many possible specific embodiments of the invention. Numerous and varied other arrangements and methods can readily be devised in accordance with the principles disclosed by those skilled in the art without departing from the spirit and scope of the invention.

I claim:

1. A credit card system comprising:
   a laminated credit card having a rectangular body including a center layer of transparent, light-transmitting material between a pair of cover sheets, said body having opposed open edges for transmitting light into and out of said center layer;
   means for coding said card to produce read-out information including: (a) a barrier consisting of a plurality of discrete opaque areas in said center layer set back to non-exposed positions substantially inwardly from said edges to render them not readily visible; and (b) said opaque areas being individually lesser in both length and width than said body and being displaced relative to one another in a direction parallel to said open edges to provide windows defining a set of straight parallel light-transmitting channels extending edgewise through said center layer at a predetermined angle and spaced apart irregularly along said card in accordance with a predetermined code;
   means for decoding said card including means for supporting said card in a laser beam focused at said predetermined angle parallel to said light-transmitting channels into one of the open edges of said center sheet toward light sensor means beyond the other open edge, said light sensor means being effective to generate a signal in response to change in intensity of said laser beam directed thereon, and means for effecting relative movement between said card on the one hand and said laser beam and light sensor means on the other hand to enable said light sensor to generate an output signal corresponding to the information coded into said set of light-transmitting channels; and
   read-out means for said light sensor means operable in response to said output signal from said light sensor for producing information decoded from said set of light-transmitting channels.

2. In a credit card system, a laser-readable credit card comprising:
   a laminated rectangular body including a center layer of transparent, light-transmitting material between a pair of cover sheets, said body having opposed open edges for transmitting light into and out of said center layer;
   means for coding said card to produce read-out information including: (a) a barrier consisting of a plurality of discrete opaque areas in said center layer set back to non-exposed positions substantially inwardly from said edges to render them not readily visible; and (b) said opaque areas being individually lesser in both length and width than said body and being displaced relative to one another in a direction parallel to said open edges to provide windows defining a set of straight parallel light-transmitting channels extending edgewise through said center layer at a predetermined angle and spaced apart irregularly along said card in accordance with a predetermined code;
   whereby the information coded into said set of channels can be decoded by scanning the card edgewise with a laser beam directed into one edge of the card toward a light sensor along the opposite edge of the card.

3. A credit card system comprising:
   a laminated credit card having a rectangular body including a center layer of transparent, light-transmitting material between a pair of cover sheets, said body having opposed open edges for transmitting light into and out of said center layer;
   means for coding said card to produce a plurality of information read-outs including a plurality of discrete opaque areas in said center layer set back to non-exposed positions substantially inwardly from said edges to render them not readily visible, said opaque area being arranged in said center layer to define a plurality of sets of parallel light-transmitting channels, each set of channels extending edgewise through said center layer at an angle different from any other set, said channels in each of said sets being spaced irregularly along said card in accordance with a predetermined code in a pattern representative of information unique to that set;
   means for decoding said card including means for supporting said card between laser means along one of said open edges and light sensor means along the other of said open edges, said laser means including means for focusing separate laser beams at different angles corresponding to the angles of said different sets of light-transmitting channels into said center layer, said light sensor means including a separate light sensor positioned to intercept each of said laser beams, each of said light sensor being effective to generate a signal in response to change in intensity of the corresponding laser beam directed thereon, and means for effecting relative movement between said card on the one hand and said laser means and light sensor means on the other hand to enable each of said light sensors to generate an individual output signal related to the information coded into the corresponding set of light-transmitting channels; and
   read-out means for each of said light sensors operable in response to the output signal from the respective light sensor for producing information decoded from the corresponding set of light-transmitting channels.

4. In a credit card system, a laser-readable, multiple read-out credit card comprising:
   a laminated rectangular body including a center layer of transparent, light-transmitting material between a pair of cover sheets, said body having opposed open edges for transmitting light into and out of said center layer;
   means for coding said card to produce multiple information read-outs including: (a) a barrier consisting of a plurality of discrete opaque areas in said center layer set back to non-exposed positions substantially inwardly from said edges to render them not readily visible; and (b) said opaque areas being individually lesser in both length and width than said body and being displaced relative to one another in a direction parallel to said open edges to provide windows defining a plurality of sets of straight parallel light-transmitting channels, each set of channels extending edgewise through said center layer at an angle different from any other set, said channels in each of said sets being spaced irregularly along said card in accordance with a predetermined code in a pattern representative of information unique to that set;
   whereby the information coded into each set of channels can be decoded separately by scanning the card edgewise with a laser beam disposed at the same angle as the set of channels decoded and directed toward a light sensor along the opposite edge of the card.

5. A credit card system comprising:

a laminated credit card having a rectangular body including a center layer of transparent, light-transmitting material between a pair of cover sheets, said body having opposed open edges for transmitting light into and out of said center layer;

means for coding said card to provide separate main and check read-outs comprising:

a. Two spaced barriers of opaque material extending along and between said open edges in said center layer;

b. pairs of light-transmitting windows arranged with one window in each of said barriers; a main set of said pairs of windows being aligned parallel to a main axis transverse to said body to define a main set of light-transmitting channels extending edgewise through said center layer, and an auxiliary set of said pairs of windows being aligned parallel to an auxiliary axis transverse to said body to define an auxiliary set of light-transmitting channels extending edgewise through said center layer; the windows in each of said main and auxiliary sets of windows being irregularly spaced along said barriers to thereby space the channels in each of said sets of light-transmitting channels irregularly along the length of the card in accordance with a predetermined code in a pattern representative of information unique to that set of channels;

means for separately and coincidentally decoding said main and auxiliary sets of light-transmitting channels comprising main and auxiliary laser means aligned respectively with said main and auxiliary axes and focused into said center sheet through one of its said open edges, and main and auxiliary light sensors along the opposite open edge axially aligned with said laser means, each of said light sensors being independently effective to generate a signal in response to change in intensity of light;

means for effecting relative movement between said card on the one hand and said laser means and light sensors on the other hand to enable each of said light sensors to generate a separate output signal corresponding to the information coded into the corresponding set of lighttransmitting channels; and separate main and auxiliary read-out means for said light sensors operable in response to the output signals from the main and auxiliary light sensors respectively for separately producing information decoded from said main and auxiliary sets of light-transmitting channels whereby information produced from one of said set of lighttransmitting channels may be employed to check the other.

6. In a multiple read-out credit card system, the combination of claim 5 in which said main and auxiliary axes are disposed at different angles within said card body.

7. In a credit card system, a laser-readable credit card comprising:

a laminated rectangular body comprising a center layer of light-transmitting material between a pair of cover sheets, said body having opposed open edges for transmitting light into and out of said center layer;

means for coding said card comprising:

a. a linear barrier of opaque material extending along and inwardly from said open edges in said center sheet; and b. light transmitting windows in said barrier spaced apart in a pattern representative of information and capable of being decoded by moving said card between a laser and light sensor and analyzing the sequence of light pulses through said windows.

8. In a credit card system, a laser-readable multiple read-out credit card comprising:

a laminated rectangular body comprising a center layer of light-transmitting material between a pair of cover sheets, said body having opposed open edges for transmitting light into and out of said center layer;

means for coding said card comprising:

a. two spaced barriers of opaque material extending along and between said open edges in said center layer; and b. pairs of light-transmitting windows arranged with one of each pair in one of said barriers and the other of each pair in the other barrier; a main set of said pairs of windows being aligned parallel to a main axis transverse to said body, and an auxiliary set of said pairs of windows being aligned parallel to an auxiliary axis disposed at an angle to said main axis; and the windows in each of said main and auxiliary sets being spaced along said barriers in a pattern representative of information unique to said set.

* * * * *